(12) United States Patent
Liu et al.

(10) Patent No.: US 12,482,163 B2
(45) Date of Patent: Nov. 25, 2025

(54) METHOD, DEVICE, AND COMPUTER PROGRAM PRODUCT FOR PROCESSING VIDEO

(71) Applicant: Dell Products L.P., Round Rock, TX (US)

(72) Inventors: Zhisong Liu, Shenzhen (CN); Zijia Wang, WeiFang (CN); Zhen Jia, Shanghai (CN)

(73) Assignee: Dell Products L.P., Round Rock, TX (US)

( * ) Notice: Subject to any disclaimer, the term of this patent is extended or adjusted under 35 U.S.C. 154(b) by 381 days.

(21) Appl. No.: 17/993,025

(22) Filed: Nov. 23, 2022

(65) Prior Publication Data

US 2024/0185494 A1    Jun. 6, 2024

(30) Foreign Application Priority Data

Oct. 21, 2022 (CN) .......................... 202211296657.8

(51) Int. Cl.
*G06T 13/40* (2011.01)
*G06N 3/0464* (2023.01)
(Continued)

(52) U.S. Cl.
CPC ........... *G06T 13/40* (2013.01); *G06N 3/0464* (2023.01); *G06N 3/08* (2013.01); *G06T 13/205* (2013.01);
(Continued)

(58) Field of Classification Search
None
See application file for complete search history.

(56) References Cited

U.S. PATENT DOCUMENTS 12,205,577 B1 *   1/2025   Kim .................... G10L 15/1815
2015/0213604 A1 *  7/2015   Li .......................... G06T 13/80
                                                          345/473
(Continued)

OTHER PUBLICATIONS

Zheng et al., "Adversarial-Metric Learning for Audio-Visual Cross-Modal Matching", Jan. 12, 2021, IEEE Transactions on Multimedia, vol. 24, pp. 338-351 (Year: 2021).*

(Continued)

*Primary Examiner* — Kent W Chang
*Assistant Examiner* — Jonathan M Cofino
(74) *Attorney, Agent, or Firm* — Ryan, Mason & Lewis, LLP

(57) ABSTRACT

Methods, devices and computer program products for processing video are disclosed herein. A method includes: generating, based on a reference image and a first frame of a video comprising an object, a two-dimensional avatar image of the object; and generating a base three-dimensional avatar of the object by performing a three-dimensional transformation on the two-dimensional avatar image and the object in the first frame. The method further includes: generating a three-dimensional avatar video corresponding to the video based on the base three-dimensional avatar and features of the video, the features comprising differences of the object between adjacent frames of the video. This solution enables the generation of a customized three-dimensional avatar video for an object in a video, where the avatar can move in synchronization with the object and retain the unique features of the object, and can provide a more detailed and vivid representation than a two-dimensional avatar.

18 Claims, 7 Drawing Sheets

(51) Int. Cl.

| | |
|---|---|
| *G06N 3/08* | (2023.01) |
| *G06T 13/20* | (2011.01) |
| *G06T 15/04* | (2011.01) |
| *G06T 17/00* | (2006.01) |
| *G10L 25/57* | (2013.01) |

(52) U.S. Cl.
CPC .............. *G06T 15/04* (2013.01); *G06T 17/00* (2013.01); *G10L 25/57* (2013.01); *G06T 2200/08* (2013.01)

(56) References Cited

U.S. PATENT DOCUMENTS

| | | | | |
|---|---|---|---|---|
| 2018/0173942 | A1* | 6/2018 | Kim ........................ | G06T 13/40 |
| 2019/0035149 | A1* | 1/2019 | Chen ..................... | G06V 40/166 |
| 2020/0035008 | A1* | 1/2020 | Kwon ..................... | G06V 40/25 |
| 2021/0027511 | A1* | 1/2021 | Shang ..................... | G06N 3/044 |

OTHER PUBLICATIONS

Yu et al., "CoCa: Contrastive Captioners are Image-Text Foundation Models", Aug. 2022, Transactions on Machine Learning Research, pp. 1-20 (Year: 2022).*
Chen et al., "Interactive Audio-text Representation for Automated Audio Captioning with Contrastive Learning", Sep. 18-22, 2022, Proc. Interspeech 2022, pp. 2773-2777 (Year: 2022).*
O. Fried et al., "Text-Based Editing of Talking-head Video," ACM Transactions on Graphics, vol. 38, No. 4, Jul. 2019, pp. 68:1-68:14.
L. Xie et al., "Realistic Mouth-Synching for Speech-Driven Talking Face Using Articulatory Modelling," IEEE Transactions on Multimedia, vol. 9, No. 3, Apr. 2007, pp. 500-510.
E. Cosatto et al., "Lifelike Talking Faces for Interactive Services," Proceedings of the IEEE, vol. 91, No. 9, Sep. 2003, pp. 1406-1429.
A. Wang et al., "Assembling an Expressive Facial Animation System," Proceedings of the 2007 ACM SIGGRAPH Symposium on Video Games, Aug. 2007, pp. 21-26.
A. Shysheya et al., "Textured Neural Avatars," IEEE/CVF Conference on Computer Vision and Pattern Recognition, Jun. 2019, pp. 2387-2397.
S. Ma et al., "Pixel Codec Avatars," IEEE/CVF Conference on Computer Vision and Pattern Recognition, arXiv:2104.04638v1, Apr. 9, 2021, 11 pages.
M. C. Doukas et al., "HeadGAN: One-Shot Neural Head Synthesis and Editing," IEEE/CVF International Conference on Computer Vision, Oct. 2021, pp. 14398-14407.
Y. Fan et al., "FaceFormer: Speech-Driven 3D Facial Animation with Transformers," arXiv:2112.05329v4, Mar. 17, 2022, 13 pages.
T.-C. Wang et al., "One-Shot Free-View Neural Talking-Head Synthesis for Video Conferencing," IEEE/CVF Conference on Computer Vision and Pattern Recognition, Jun. 2021, pp. 10039-10049.
E. Zakharov et al., "Few-Shot Adversarial Learning of Realistic Neural Talking Head Models," IEEE/CVF International Conference on Computer Vision, arXiv:1905.08233v2, Sep. 25, 2019, 21 pages.
K. R. Prajwal et al., "A Lip Sync Expert Is All You Need for Speech to Lip Generation in the Wild," Proceedings of the 28th ACM International Conference on Multimedia, arXiv:2008.10010v1, Aug. 23, 2020, 10 pages.
A. Lahiri et al., "LipSync3D: Data-Efficient Learning of Personalized 3D Talking Faces from Video using Pose and Lighting Normalization," arXiv:2106.04185v1, Jun. 8, 2021, 16 pages.
J. S. Chung et al., "Out of Time: Automated Lip Sync in the Wild," Workshop on Multi-view Lip-reading, Asian Conference on Computer Vision, Nov. 2016, 14 pages.
X. Huang et al., "Arbitrary Style Transfer in Real-Time with Adaptive Instance Normalization," arXiv:1703.06868v2, Jul. 30, 2017, 11 pages.
X. Li et al., "Learning Linear Transformations for Fast Arbitrary Style Transfer," IEEE/CVF Conference on Computer Vision and Pattern Recognition, arXiv:1808.04537v1, Aug. 14, 2018, 12 pages.
Y. Li et al., "Diversified Texture Synthesis with Feed-Forward Networks," arXiv:1703.01664v1, Mar. 5, 2017, 11 pages.
F. Luan et al., "Deep Photo Style Transfer," arXiv:1703.07511v3, Apr. 11, 2017, 9 pages.
Y. Li et al., "Universal Style Transfer via Feature Transforms," 31st Conference on Neural Information Processing Systems, Dec. 2017, 11 pages.
W. Ma et al., "Block Shuffle: A Method for High-Resolution Fast Style Transfer with Limited Memory," IEEE Access, arXiv:2008.03706v1, Aug. 9, 2020, 12 pages.
D. Y. Park et al., "Arbitrary Style Transfer With Style-Attentional Networks," arXiv:1812.02342v5, May 23, 2019, 9 pages.
T. Karras et al., "Progressive Growing of GANs for Improved Quality, Stability, and Variation," The Sixth International Conference on Learning Representations, arXiv:1710.10196v3, Feb. 26, 2018, 26 pages.
T. Karras et al., "Analyzing and Improving the Image Quality of StyleGAN," IEEE/CVF Conference on Computer Vision and Pattern Recognition, Jun. 2020, pp. 8110-8119.
S. Yang et al., "Pastiche Master: Exemplar-Based High-Resolution Portrait Style Transfer," Conference on Computer Vision and Pattern Recognition, Mar. 24, 2022, 16 pages.
T. Karras et al., "A Style-Based Generator Architecture for Generative Adversarial Networks," IEEE/CVF Conference on Computer Vision and Pattern Recognition, Jun. 2019, pp. 4401-4410.
A. Baevski et al., "wav2vec 2.0: A Framework for Self-Supervised Learning of Speech Representations," Proceedings of the 34th International Conference on Neural Information Processing Systems, arXiv:2006.11477v3, Oct. 22, 2020, 19 pages.
F. Reda et al., "Pytorch Implementation of FlowNet 2.0: Evolution of Optical Flow Estimation with Deep Networks," https://github.com/NVIDIA/flownet2-pytorch, Accessed Jul. 21, 2022, 4 pages.
M. Loper et al., "SMPL: A Skinned Multi-Person Linear Model," ACM Transactions on Graphics, vol. 34, No. 6, Nov. 2015, 16 pages.
E. Corona et al., "SMPLicit: Topology-aware Generative Model for Clothed People," 2021 IEEE/CVF Conference on Computer Vision and Pattern Recognition, Jun. 2021, pp. 11875-11885.
T. Li et al., "Learning a Model of Facial Shape and Expression from 4D Scans," ACM Transactions on Graphics, vol. 36, No. 6, Nov. 2017, 17 pages.
L. Wang et al., "HMM Trajectory-guided Sample Selection for Photo-realistic Talking Head," Multimedia Tools and Applications, vol. 74, No. 22, Nov. 2015, pp. 9849-9869.
K. Simonyan et al., "Very Deep Convolutional Networks for Large-Scale Image Recognition," International Conference on Learning Representations, arXiv:1409.1556v6, Apr. 10, 2015, 14 pages.

* cited by examiner

METHOD, DEVICE, AND COMPUTER PROGRAM PRODUCT FOR PROCESSING VIDEO

RELATED APPLICATION

The present application claims priority to Chinese Patent Application No. 202211296657.8, filed Oct. 21, 2022, and entitled "Method, Device, and Computer Program Product for Processing Video," which is incorporated by reference herein in its entirety.

FIELD

Embodiments of the present disclosure relate to computer technologies and, more specifically, to a method, a device, and a computer program product for processing video.

BACKGROUND

With the rapid development of metaverse and virtual reality, the use of avatars to replace real images of users in videos is becoming increasingly common in a variety of fields such as virtual conferencing and video gaming, among others. The use of avatars can provide a variety of benefits, for example, enhancing the level of interest of applications, protecting the privacy of users, and the like. With the popularity of avatars, there is a growing need to generate customized high-quality avatar videos.

SUMMARY

Embodiments of the present disclosure provide a solution for processing video.

In a first aspect of the present disclosure, a method for processing video is provided, including: generating, based on a reference image and a first frame of a video comprising an object, a two-dimensional avatar image of the object; generating a base three-dimensional avatar of the object by performing a three-dimensional transformation on the two-dimensional avatar image and the object in the first frame; and generating a three-dimensional avatar video corresponding to the video based on the base three-dimensional avatar and features of the video, the features comprising image differences of the object between adjacent frames of the video.

In a second aspect of the present disclosure, an electronic device is provided that includes a processor and a memory coupled to the processor, wherein the memory has instructions stored therein which, when executed by the processor, cause the electronic device to perform actions including: generating, based on a reference image and a first frame of a video comprising an object, a two-dimensional avatar image of the object; generating a base three-dimensional avatar of the object by performing a three-dimensional transformation on the two-dimensional avatar image and the object in the first frame; and generating a three-dimensional avatar video corresponding to the video based on the base three-dimensional avatar and features of the video, the features comprising image differences of the object between adjacent frames of the video.

In a third aspect of the present disclosure, a computer program product is provided. The computer program product is tangibly stored on a non-transitory computer-readable medium and includes machine-executable instructions, wherein the machine-executable instructions, when executed by a machine, cause the machine to execute the method according to the first aspect of the present disclosure.

It should be noted that this Summary is provided to introduce a selection of concepts in a simplified manner, which will be further described in the Detailed Description below. The Summary is neither intended to identify key features or major features of content of the present disclosure, nor intended to limit the scope of the content of the present disclosure.

BRIEF DESCRIPTION OF THE DRAWINGS

By further detailed description of example embodiments of the present disclosure, provided herein with reference to the accompanying drawings, the above and other objectives, features, and advantages of the present disclosure will become more apparent, in which.

Throughout all the drawings, the same or similar reference numerals represent the same or similar elements.

DETAILED DESCRIPTION

Figure 1:
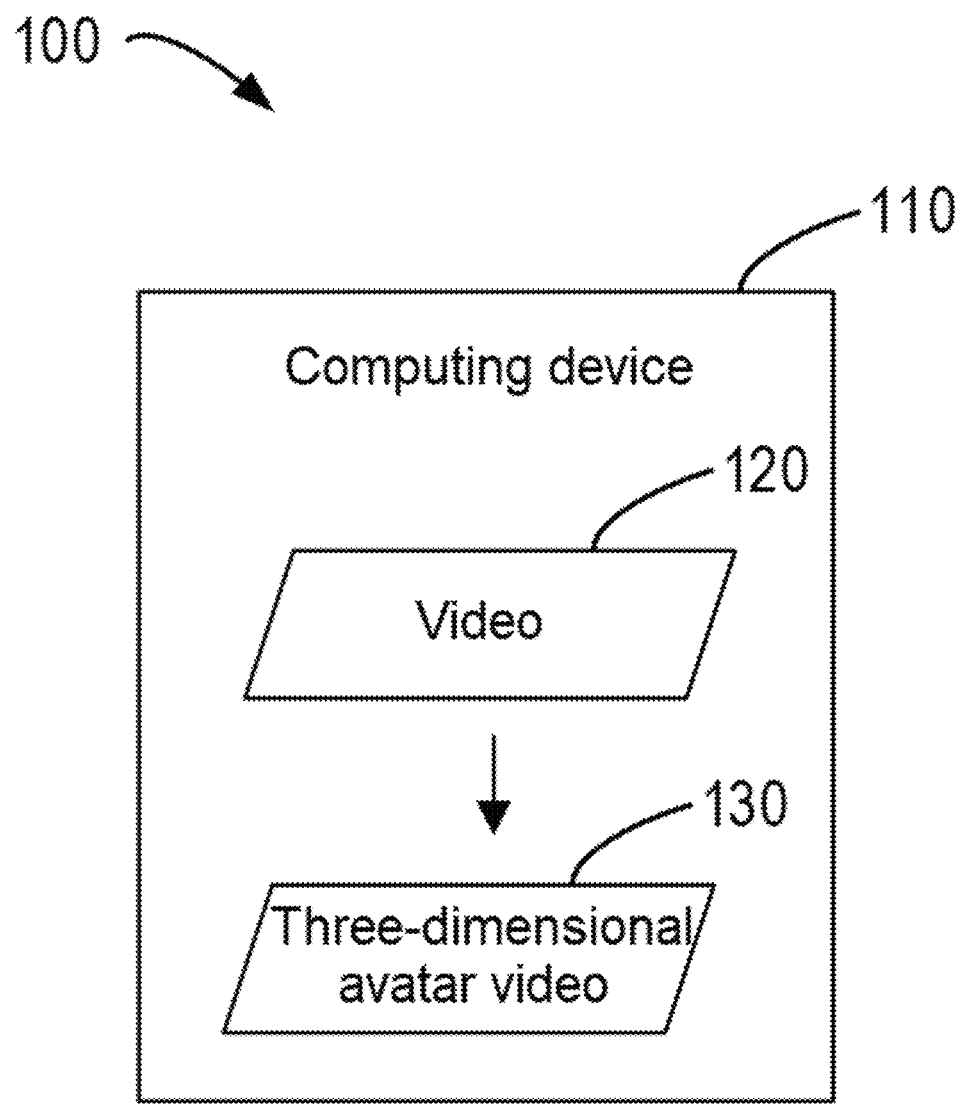
FIG. 1 illustrates a schematic diagram of an example environment in which a plurality of embodiments of the present disclosure can be implemented.

Illustrative embodiments of the present disclosure will be described in more detail below with reference to the accompanying drawings. Although the accompanying drawings show some embodiments of the present disclosure, it should be understood that the present disclosure can be implemented in various forms, and should not be construed as being limited to the embodiments stated herein. Rather, these embodiments are provided for understanding the present disclosure more thoroughly and completely. It should be understood that the accompanying drawings and embodiments of the present disclosure are for illustrative purposes only, and are not intended to limit the protection scope of the present disclosure.

The term "include" and its variants as used herein mean open-ended inclusion, i.e., "including but not limited to." The term "based on" is "based at least in part on." The term "one embodiment" means "at least one embodiment." The term "another embodiment" indicates "at least one additional embodiment." Relevant definitions of other terms will be given in the description below.

The use of avatars to replace real images of users in videos is becoming increasingly popular in a variety of fields such as virtual conferencing and video gaming, among others, and the need to generate high-quality avatar videos is growing as a result. Conventional video avatar generation methods typically replace a target face or an entire character with an existing mask (e.g., cartoon character, public figure, etc.). Such methods lack flexibility and cannot reflect real-time changes such as facial expressions of the replaced character. Some other avatar generation methods are based on manipulating the warping of facial features of a reference image to match the audio and voice content in the video. However, these methods ignore the unique identity of the user, which may lead to identity theft and other network security issues.

To at least partially solve the above and other potential problems, embodiments of the present disclosure provide a solution for processing video. This solution generates a two-dimensional avatar image of a target object (e.g., a user himself or herself) in the video based on a reference image with a desired style (e.g., the ideal avatar style chosen by the user) and a first frame of the video. Further, by encoding and decoding the features of the first frame and the two-dimensional avatar image, the two-dimensional avatar image is projected and warped onto a three-dimensional avatar model, where the two-dimensional texture details are transformed into a three-dimensional representation to add realistic facial features. As a result, a base three-dimensional avatar for the target object can be generated, wherein the base three-dimensional avatar has the style of the reference image while retaining the unique features of the target object. On this basis, a three-dimensional avatar video corresponding to the video can be generated based on the base three-dimensional avatar and features such as the motion of the object in the video, wherein the avatar acts and speaks in the same manner as the object in the source video.

In some embodiments of the present disclosure, multi-modality features including motion features of the object between images, audio features, and text features are taken into consideration when generating the three-dimensional avatar video. A cross-modality encoder is used to learn a three-dimensional warping matrix that can warp a base three-dimensional avatar and align it with audio and text. Furthermore, in order to supervise a training process of a model in the framework for generating a three-dimensional avatar video, some embodiments of the present disclosure use a multi-modality three-dimensional avatar network as an efficient supervisory mechanism to learn the mapping relationship between avatar motion and audio. The trained model does not need heavy computation and can be arranged on lightweight computing devices such as edge computers for use in real-time generation of three-dimensional avatar videos.

The solution of the present disclosure provides a multi-dimensional avatar generation framework that can, for example, generate a customized three-dimensional avatar video for an object in a video, where the avatar can move in synchronization with the object (for example, having the same expressions, movements, and speeches as the target character in the source video) and retain the unique features of the object. Such three-dimensional videos have depth information that two-dimensional avatars do not have, thus providing a more detailed and vivid representation. This solution can be applied to video conferencing, gaming, customer service, data experience centers, and many other applications.

The solution of the present disclosure will be described in the context of face three-dimensional avatars in the following description and accompanying drawings, but it should be understood that the solution of the present disclosure may also be applicable to the generation of three-dimensional avatar videos for other active objects in the video.

FIG. 1 illustrates a schematic diagram of example environment 100 in which a plurality of embodiments of the present disclosure can be implemented. This example environment 100 includes computing device 110. Computing device 110 may use the method of the present disclosure to generate, according to video 120, three-dimensional avatar video 130 corresponding thereto. In three-dimensional avatar video 130, the target object (e.g., a character in an online conference or the head thereof) is replaced with a corresponding three-dimensional avatar.

Video 120 may include images, and in some embodiments, may include audio and the text (e.g., as subtitles) of the voice in the audio. In some embodiments, such as in a real-time online conference, the images of video 120 may be acquired by computing device 110 in real time. Sound in the stream of video 120 may be acquired by a microphone of computing device 110. The text in video 120 may be transcribed from the sound collected by the microphone. In some other embodiments, computing device 110 may also receive all or part of the data of video 120 from an external device.

Computing device 110 may transform the images in video 120 by performing a variety of encoding and decoding of video 120 (for example, changing the style of an image, generating a three-dimensional projection for an object in the image, generating a three-dimensional avatar, etc.), thereby generating three-dimensional avatar video 130.

Examples of computing device 110 include, but are not limited to, a desktop computer, a server computer, a tablet computer, a laptop, a smartphone, a personal digital assistant (PDA), a server, and the like. In addition, although illustrated as a single device, computing device 110 may also be a plurality of devices, a virtual device, or any other form of devices suitable for implementing embodiments of the present disclosure.

The architecture and functions in example environment 100 are described for illustrative purposes only, and do not imply any limitation to the scope of the present disclosure. There may also be other devices, systems, or components that are not shown in example environment 100. Furthermore, embodiments of the present disclosure may also be applied to other environments having different structures and/or functions.

Figure 2:
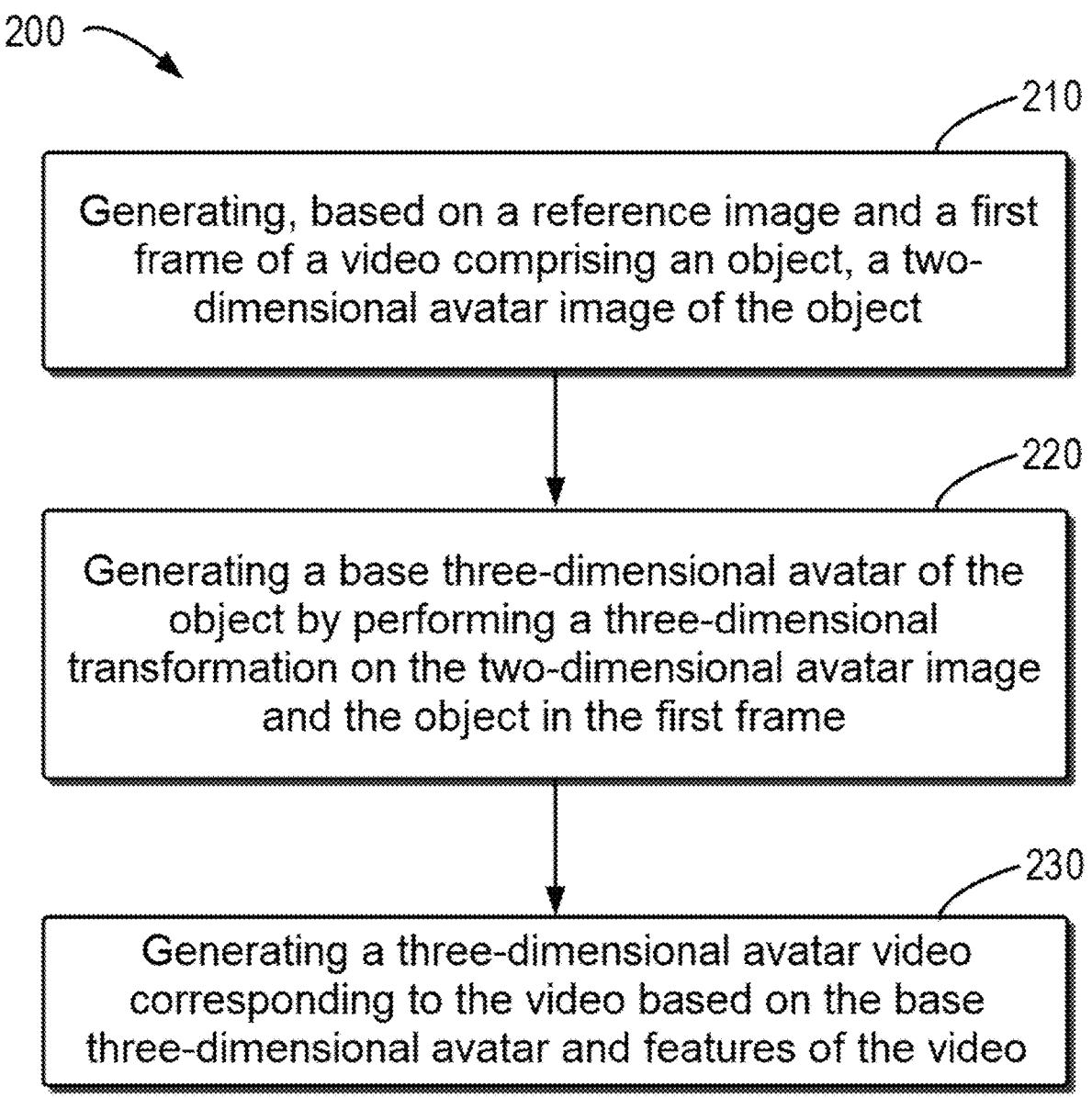
FIG. 2 illustrates a flow chart of a method for processing video according to some embodiments of the present disclosure.

FIG. 2 illustrates a flow chart of example method 200 for processing video according to some embodiments of the present disclosure. Example method 200 may be executed, for example, by computing device 110 shown in FIG. 1. It should be understood that method 200 may also include additional actions not shown, and the scope of the present disclosure is not limited in this regard. Method 200 is described in detail below in conjunction with example environment 100 of FIG. 1.

Figure 3:
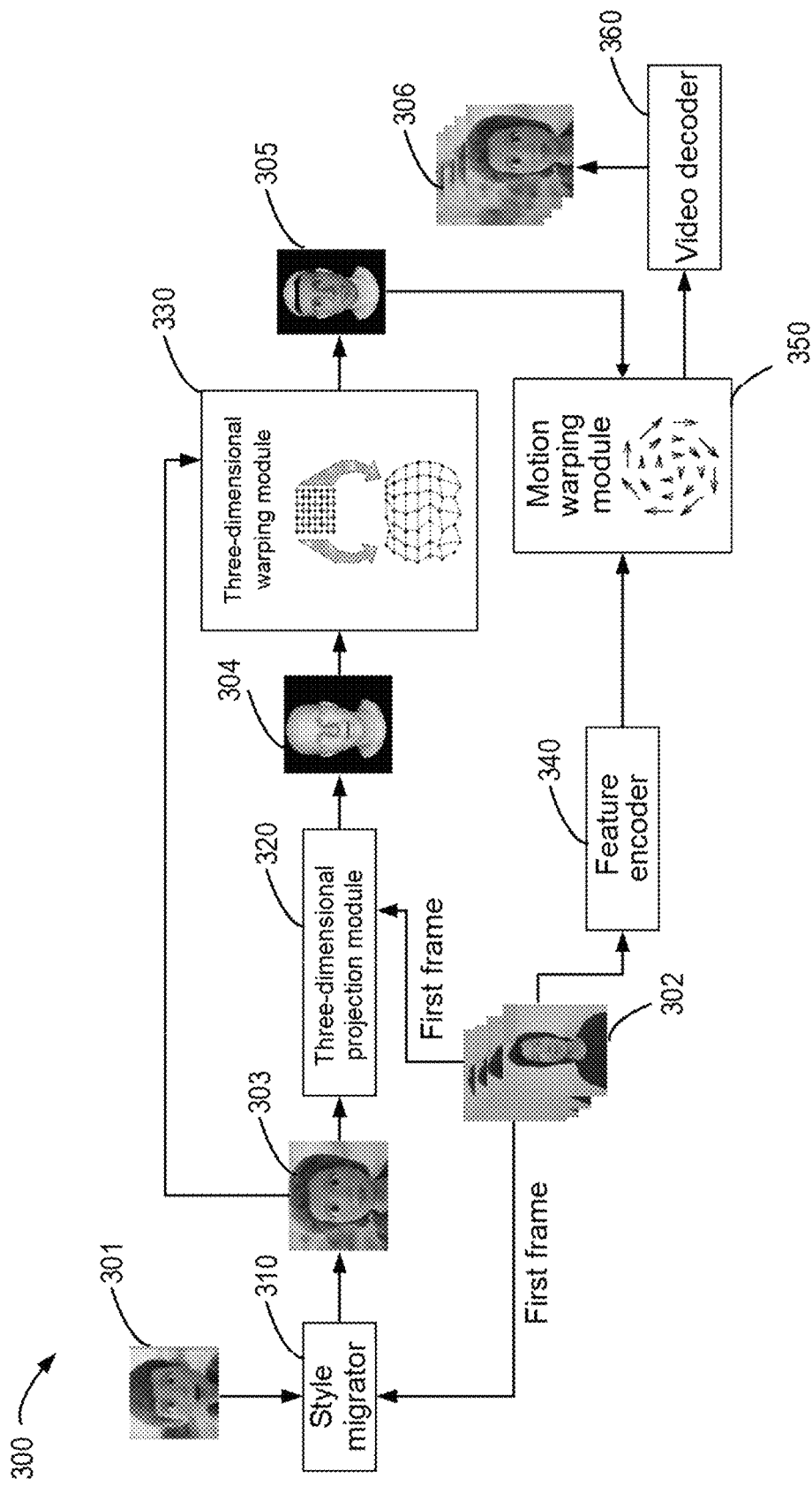
FIG. 3 illustrates a schematic diagram of example video processing according to some embodiments of the present disclosure.

At block 210, based on a reference image and a first frame of a video comprising an object, a two-dimensional avatar image of the object is generated. As an example, FIG. 3 illustrates schematic diagram 300 of example video processing according to some embodiments of the present disclosure, wherein the video processing process may be performed by, for example, computing device 110. As shown in FIG. 3, using style migrator 310, computing device 110 may generate two-dimensional avatar image 303 of a target character in video 302 based on reference image 301 and a first frame of video 302. Style migrator 310 may migrate the style of the reference image to the source image of the first frame, such that two-dimensional avatar image 303 has both the style of reference image 301 and the unique features of the target character in video 302.

Referring back to FIG. 2, at block 220, a base three-dimensional avatar of the object is generated by performing a three-dimensional transformation on the two-dimensional avatar image and the object in the first frame. For example, computing device 110 may generate a base three-dimensional avatar of the object by performing a three-dimensional transformation on the two-dimensional avatar image and the object in the first frame. As shown in FIG. 3, for example, computing device 110 may use three-dimensional projection module 320 to learn features of the character object in two-dimensional avatar image 303 and the first frame of video 302 and project the features onto a three-dimensional character template to generate three-dimensional projection representation 304 of the object. Computing device 110 may further utilize a three-dimensional warping module 330 to warp the lighting, color, etc., of the two-dimensional avatar image to align with the three-dimensional projection representation, thereby generating base three-dimensional avatar 305 of the character object.

In some embodiments, computing device 110 may generate the three-dimensional projection representation 304 of the object based on the shape, posture, and expression of the object in the first frame of video 302 and two-dimensional avatar image 303. In some embodiments, computing device 110 may also take into account texture details of the object in the first frame and the two-dimensional avatar image when generating the three-dimensional projection representation of the object. In some embodiments, computing device 110 may then generate the base three-dimensional avatar of the object based on a camera position at which the first frame was captured, color and lighting information of the two-dimensional avatar image, and the three-dimensional projection representation. The generation of the base three-dimensional avatar will be described in more detail below with respect to FIG. 4.

With continued reference to FIG. 2, at block 230, a three-dimensional avatar video corresponding to the video is generated based on the base three-dimensional avatar and features of the video, the features comprising image differences of the object between adjacent frames of the video. For example, computing device 110 may generate a three-dimensional avatar video corresponding to the video based on the base three-dimensional avatar and features of the video.

As an example, feature encoder 340 may be used in computing device 110 to extract the features of video 302. In some embodiments, computing device 110 may take image data of each frame in video 302 as an input and extract time feature maps from these image data as image difference features. The image difference features represent differences of the target object between adjacent images in the sequence of frames of video 302, which may reflect the motion of the object between different frames. Computing device 110 may use, for example, an optical flow model or a pre-trained convolutional neural network (CNN) or other neural network to extract the image difference features of the object.

In some embodiments, in addition to the image difference features, computing device 110 may also extract audio features and text features of video 302. Computing device 110 may then fuse the extracted features of a plurality of modalities to acquire fused features of video 302 for further processing. The cross-modality encoding of video features will be described in more detail below with respect to FIG. 5.

Computing device 110 may then use motion warping module 350 to perform computation on the encoded features of video 302 as well as base three-dimensional avatar 305 to generate three-dimensional avatars of the remaining frames of video 302. The result of this computation is then decoded by video decoder 360 into three-dimensional avatar video 306 corresponding to video 302. Three-dimensional avatar video 306 includes a three-dimensional avatar that has a style consistent with reference image 301 and has similar motions (e.g., expressions and movements) with the object in the stream of the video.

In some embodiments, computing device 110 may generate different three-dimensional avatar videos by means of a weight parameter (for example, input by the user). For example, the smaller the weight, the more similar the avatar in the three-dimensional avatar video generated by computing device 110 can be to the target object.

Using method 200, a two-dimensional avatar image can be converted to a three-dimensional avatar based on the migration of the style of the reference image to the avatar, thereby generating a customized three-dimensional avatar video for a specific object (e.g., a character). The three-dimensional avatar video can provide detailed depth features that two-dimensional avatars do not have, thus making the avatar more realistic and natural. Such three-dimensional avatars can make the application more interesting and protect user privacy, while adapting to the unique features of the object of the source video in the three-dimensional world and its motion, making the avatars well recognizable.

Figure 4:
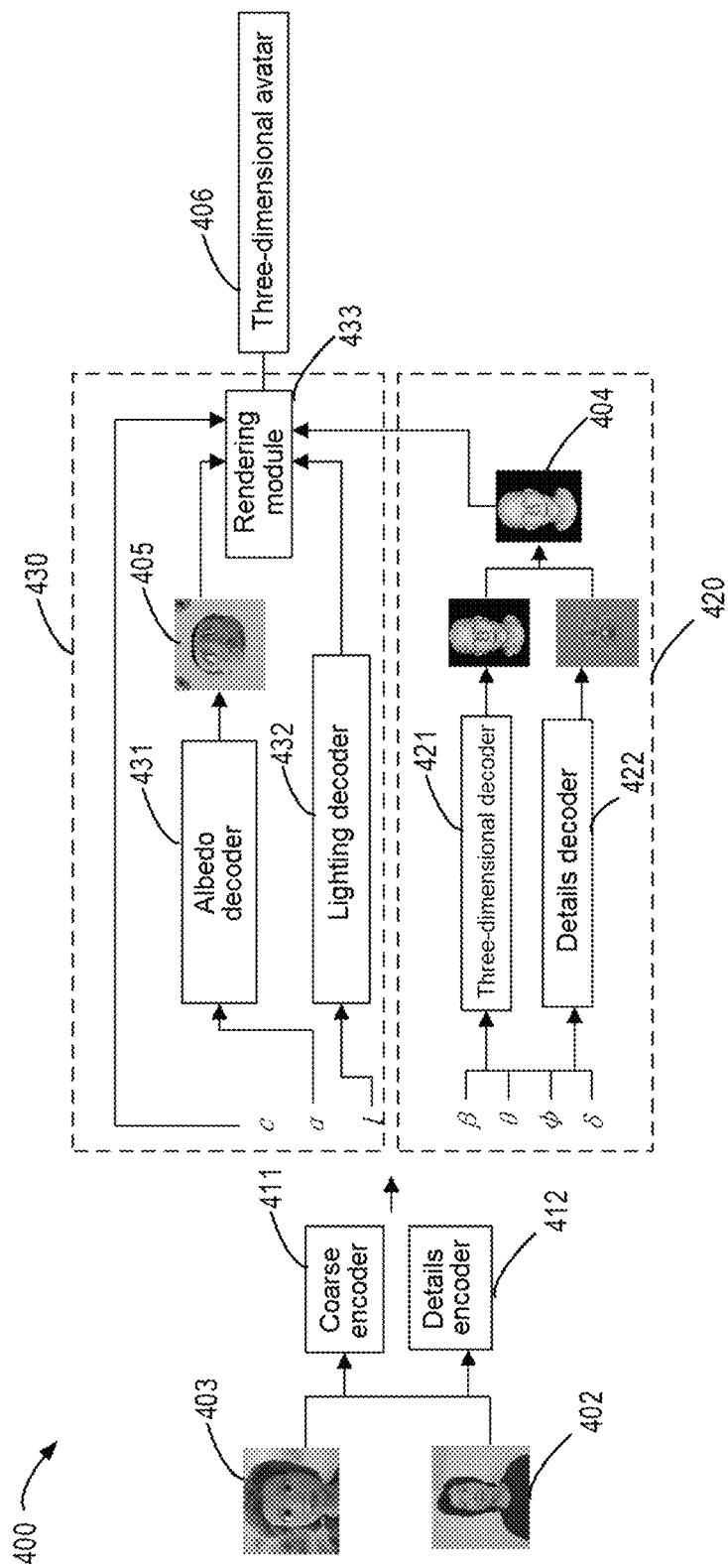
FIG. 4 illustrates a schematic diagram of an example of the generation of a base three-dimensional avatar according to some embodiments of the present disclosure.

FIG. 4 illustrates schematic diagram 400 of an example of the generation of a base three-dimensional avatar according to some embodiments of the present disclosure. The process of generating the base three-dimensional avatar in schematic diagram 400 may be performed, for example, by computing device 110 shown in FIG. 1. Schematic diagram 400 is described in detail below in connection with example environment 100 of FIG. 1.

As shown in FIG. 4, computing device 110 may use coarse encoder 411 and details encoder 412 to extract potential feature vectors of object features (facial features of a character in this example) from first frame 402 of the source video and two-dimensional avatar image 403. Two-dimensional avatar image 403 may be generated, for example, in accordance with the method described previously with respect to block 210. In this example, the extracted potential feature vector includes codes of the following features: camera code c, which denotes information about the camera position at which the video frame was captured; albedo code $\alpha$, which denotes information about the base color of the object after removing the influence of lighting, etc.; lighting code l, which denotes information about the lighting; shape code $\beta$, which denotes information about the shape of the object; posture code $\theta$, which denotes information about the posture of the object; expression code $\Phi$, which denotes information about the expression of the object; and details code $\delta$, which denotes the texture details of the object.

On this basis, computing device 110 may use three-dimensional projection module 420 and three-dimensional warping module 430 to generate base three-dimensional avatar 406 from first frame 402 of the source video and two-dimensional avatar image 403. Three-dimensional projection module 420 and three-dimensional warping module 430 may correspond to three-dimensional projection module 320 and three-dimensional warping module 330 in FIG. 3, respectively.

Computing device 110 may use three-dimensional decoder 421 in three-dimensional projection module 420 and use codes of the shape, posture, and expression (β, θ, Φ) as an input to align the two-dimensional avatar image with the three-dimensional object template (the head template in this example). For example, three-dimensional decoder 421 may use a FLAME model to accomplish the above processing. Further, computing device 110 uses details decoder 422 to process details code δ to learn a displacement map. Setting the output from three-dimensional decoder 421 to be $M_{uv}$, and the displacement to be D, then three-dimensional projection representation 404 of the object can be acquired as shown in the following Equation (1) as:

$$M'_{uv}=M_{uv}+D\odot N_{uv} \quad (1)$$

where $N_{uv}$ is the surface normal of $M_{uv}$.

With respect to three-dimensional warping module 430, computing device 110 may use lighting decoder 432 to learn a spherical harmonics function model related to lighting code l to predict the shadow of the three-dimensional avatar. In addition, computing device 110 may use albedo decoder 431 to process albedo code α to obtain albedo map 405. Further, computing device 110 may use differentiable rendering module 433 to render base three-dimensional avatar 406. Rendering module 433 may calculate, from $M'_{uv}$, the normal N' thereof, and acquire three-dimensional avatar rendering with details by rendering M together with the normal map, as shown in the following Equation (2):

$$I'_r = \mathcal{R}(M,B(\alpha,l,N'),c) \quad (2)$$

where B is the lighting model and $\mathcal{R}$ denotes the differentiable rendering model. In an example, the rendering module may be implemented based on a differentiable rasterization model.

Figure 5:
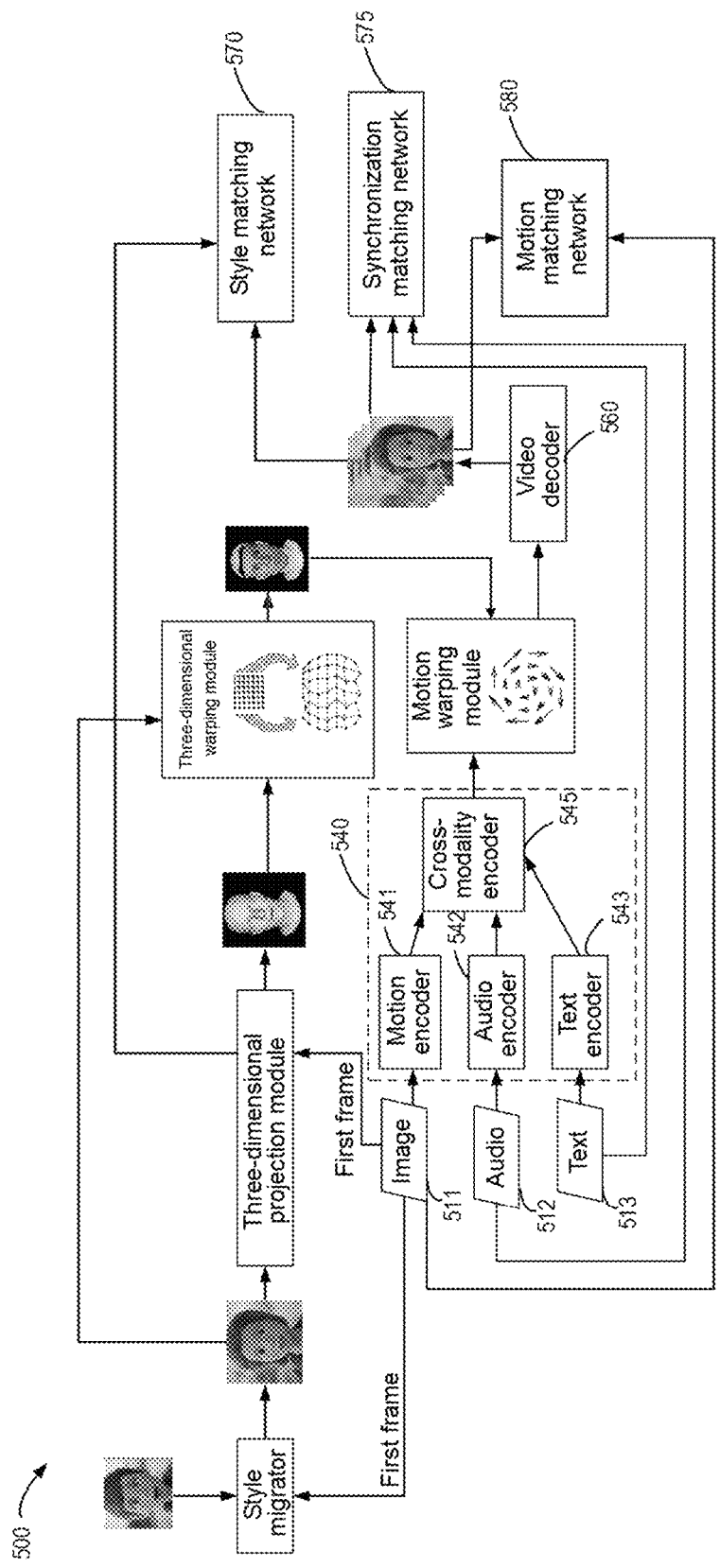
FIG. 5 illustrates an example framework for processing video according to some embodiments of the present disclosure.

In some embodiments, computing device 110 may utilize a generation model for three-dimensional avatar videos to implement the generation of the three-dimensional avatar video as described above. To supervise the training and use of the generation model, in some such embodiments, a plurality of sub-networks are introduced into the entire video processing framework to calculate the loss of the three-dimensional avatar video output from the generation model. FIG. 5 illustrates example framework 500 for video processing according to some embodiments of the present disclosure, in which such a plurality of sub-networks are introduced. In framework 500, the generation model may be a generation model for performing the video processing in FIG. 3, wherein feature encoder 540 may correspond to feature encoder 340 in FIG. 3.

Feature encoder 540 includes motion encoder 541, wherein motion encoder 541 uses image data 511 of the video (e.g., video 302) as an input to extract image difference features reflecting the motion of the object as described previously with respect to FIG. 3. The feature encoder further includes audio encoder 542 and text encoder 543. Audio encoder 542 may use audio data 512 of the same video as an input to extract audio features of the video. For example, audio encoder 542 may convert the original audio to a Mel frequency cepstral coefficient (MFCC) representation, so that the one-dimensional audio signal can be expanded into a two-dimensional frequency map. Audio encoder 542 may then use a VGG-like network to extract the audio feature map, where VGG denotes Visual Geometry Group, and the VGG-like network is a type of CNN. Text encoder 543 uses text (subtitle) data 513 of the same video as an input to extract text features of the video. For example, text encoder 543 may use an audio transcription model to generate video text and then use a multi-layer perceptron (MLP) to extract text depth features.

Further, the extracted image difference features, voice features, and text features are input into cross-modality encoder 545. Cross-modality encoder 545 learns the cross correlation between these features to acquire the fused features of the video. The fused features are information extracted across multiple modalities and have more robust representation characteristics compared with features of a single feature domain. In addition, the audio features and text features may be implicitly aligned with the image features, so that the representations of feature domains (e.g., in the form of feature vectors) can be normalized.

In some embodiments, cross-modality encoder 545 may learn cross-attention reflecting the binomial correlation between features of various modalities and use the cross-attention mechanism to generate residual vectors of the video features. Further, cross-modality encoder 545 may generate the fused features of the video based on the residual vectors and the features of each modality, wherein the process may be mathematically represented by the following Equation (3):

$$F_{CA} = F_{con} + \sigma\left(\frac{Q_V K_A^T}{\sqrt{d}}\right)V_A + \sigma\left(\frac{Q_V K_T^T}{\sqrt{d}}\right)V_T + \sigma\left(\frac{Q_T K_A^T}{\sqrt{d}}\right)V_A \quad (3)$$

$$F_{con} = W(\phi(T(F_V)), \phi(F_A), \phi(F_T))$$

where $F_V$ is the image difference feature map, $F_A$ is the voice feature vector, $F_T$ is the text feature vector, φ is the normalization function (e.g., L2-norm), T(·) is an average pooling function, $F_{con}$ is the feature fusion vector, σ is the Sigmoid function, and $Q_i$, $K_i$, and $V_i$, i=V, T, A, are the inquiries, keys, and values from images, text, and audio of the video, respectively, according to the cross-attention model.

As shown in Equation (3), in the above process, since image difference feature map $F_V$ is a two-dimensional feature map, cross-modality encoder 545 first compresses $F_V$ into a one-dimensional vector using the average pooling function T(·), and normalizes all feature vectors using the normalization function φ. These vectors are then concatenated to acquire $F_{con}$.

The video fusion feature generated by feature encoder 540 is then used along with the base three-dimensional avatar to further generate the three-dimensional avatar video. The other parts of the generation model have been described in detail previously with respect to FIG. 3 and will not be repeated here.

In addition, framework 500 further includes style matching network 570, synchronization matching network 575, and motion matching network 580. Style matching network 570 provides a style loss function to determine the style loss of the three-dimensional avatar video generated by the generation model compared with the reference image. Synchronization matching network 575 provides a synchronization loss function to determine the matching degree between the image stream of the generated three-dimensional avatar video and the audio. Motion matching network 580 provides a motion loss function to determine the matching degree between the motion stream of the generated three-dimensional avatar video and the source video. The motion loss function may be implemented, for example, based on an optical flow model. In some embodiments, computing device 110 may use one or more of the above loss functions to train the generation model for avatar videos.

Since knowledge related to the ground truth of three-dimensional dynamic avatars is not initially available, computing device 110 may acquire a priori knowledge to supervise the training and use of the video model. For example, after the base three-dimensional avatar for the first frame is generated, knowledge may be needed about how to generate three-dimensional avatars for subsequent frames in a way matching the audio and text. In some embodiments, computing device 110 may train each of the above networks based on a generative adversarial network (GAN) to determine the corresponding loss functions. The determined loss functions may then be used to train the generation model for three-dimensional avatar videos.

Figure 6:
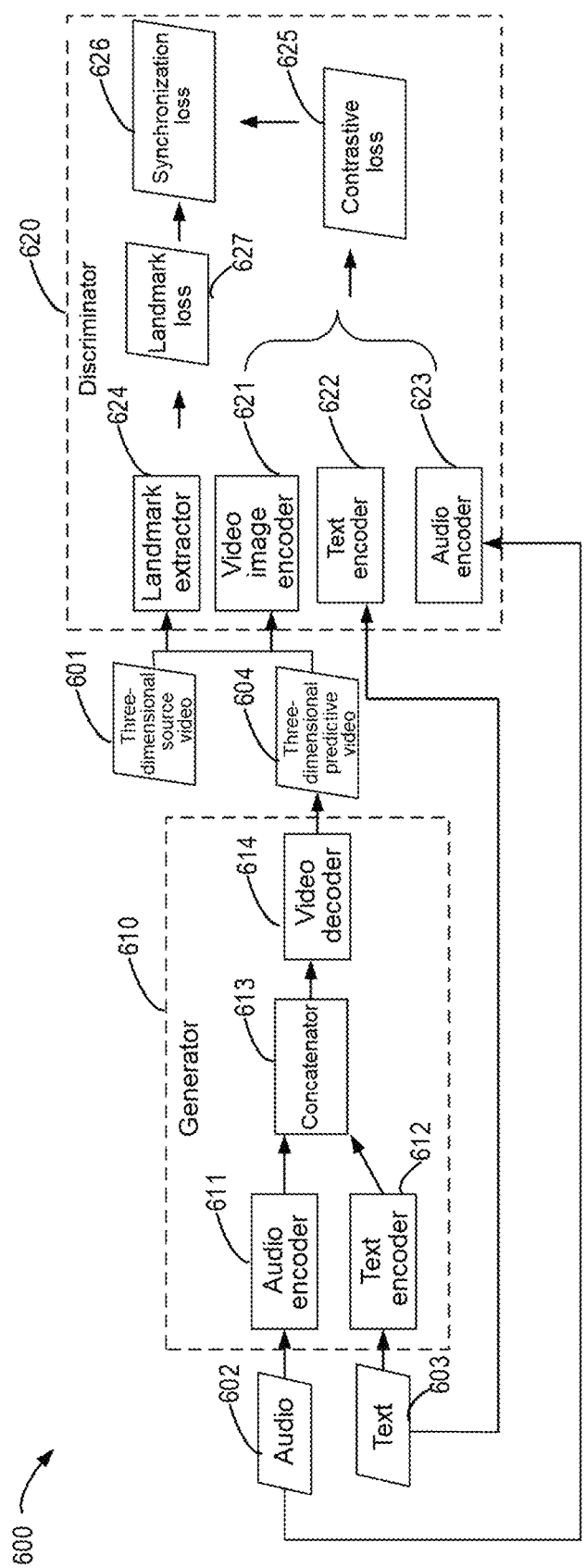
FIG. 6 illustrates an example architecture for determining a synchronization loss function of calculating a synchronization loss of a three-dimensional avatar video according to some embodiments of the present disclosure.

By way of illustration, FIG. 6 illustrates example architecture 600 according to some embodiments of the present disclosure, where example architecture 600 may be used to determine a synchronization loss function (for example, provided by synchronization matching network 575) that may then be used to train the generation model for three-dimensional avatar videos. Example architecture 600 may be implemented on computing device 110.

Example architecture 600 is built based on a GAN and includes generator 610 and discriminator 620. Generator 610 includes audio encoder 611, text encoder 612, and video decoder 614 (for example, corresponding to audio encoder 542, text encoder 543, and video decoder 560 in FIG. 5) used in the generation model to be trained.

Generator 610 may extract text features and audio features from audio data 602 and text data 603, respectively, of three-dimensional source video 601 including the three-dimensional avatar. These features are then encoded by concatenator 613 along with the first frame (not shown), which already includes the three-dimensional avatar of the object, of three-dimensional source video 601. The output from concatenator 613 is then further decoded by the video decoder to generate reconstructed three-dimensional predictive video 604.

Discriminator 620 uses another set of video image encoder 621, text encoder 622, and audio encoder 623. Video image encoder 621 uses a multi-gray image as an input. For example, this video image encoder 621 may be a deep convolutional neural network (CNN) that gradually decreases the feature dimension and expands the number of channels. These encoders may process the image data of three-dimensional predictive video 604, audio data 602 and text data 603 of three-dimensional source video 601, and process three-dimensional source video 601 as the ground truth.

Discriminator 620 may then calculate the contrastive loss between the features of each pair of modalities among the multi-modality features output by the encoders, and the calculation may include: calculating an image-audio contrastive loss using an image-audio contrastive loss function based on the images and audio; calculating an image-text contrastive loss using an image-text contrastive loss function based on the images and text; and calculating an audio-text contrastive loss using an audio-text contrastive loss function based on the audio and text. These three losses are then combined into contrastive loss 625 to serve as synchronization loss 626. For example, when the average output value of synchronization loss 626 is close to 1, it indicates that the three-dimensional image of the predictive video can match well with the original audio and text, and when the average output value of this synchronization loss function is 0, it indicates that the three-dimensional image of the predictive video does not match well with the original audio and text.

In some embodiments, the discriminator further includes landmark extractor 624, wherein this landmark extractor 624 may extract a plurality of landmark points from the predictive images and the ground truth image, so as to use a landmark loss function to calculate landmark loss 627. Landmark loss 627 reflects the difference of the landmarks between the predictive video images and the ground truth image. In such embodiment, landmark loss 627 and contrastive loss 625 are combined together into synchronization loss 626. In an example, landmark extractor 624 extracts 68 facial landmarks for a target character, and the landmark loss can be calculated as shown in the following Equation (4):

$$z = \frac{1}{68} \|d_i - d'_i\|^2 \qquad (4)$$

where $d_i$ and $d'_i$ are representations (e.g., position representations) of the i-th landmark in the ground truth image and the predictive image, respectively. It should be understood that the number of landmarks in the example is only an example, and for example, for different object types, applications, etc., the landmark extractor may also extract other numbers of landmarks.

In order to determine the synchronization loss function for calculating the synchronization loss, computing device 110 may collect a large number of three-dimensional avatar videos as training data to train the architecture, so as to determine an image-audio contrastive loss function, an image-text contrastive loss function, and an audio-text contrastive loss function, as well as a landmark loss function in some embodiments. Based on the determined loss functions described above, the synchronization loss function may be determined. When training is completed, the synchronization loss function may be fixed for use in supervising and training the generation model for three-dimensional avatars in the overall architecture according to embodiments of the present disclosure.

Figure 7:
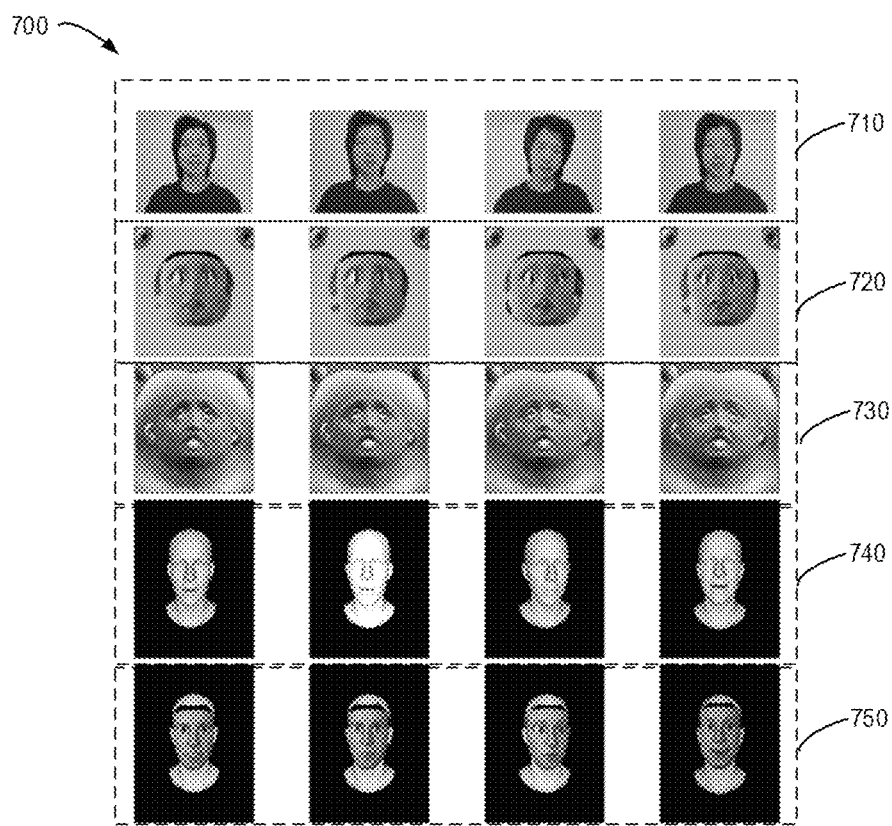
FIG. 7 illustrates a schematic diagram of an intermediate result in an example implementation for generating a three-dimensional avatar for a video frame according to some embodiments of the present disclosure.

To illustrate the effect of embodiments of the present disclosure, FIG. 7 illustrates schematic diagram 700 of an intermediate result in an example implementation for generating a three-dimensional avatar for a video frame according to some embodiments of the present disclosure. These results may be generated, for example, according to the methods and processes described previously with respect to FIGS. 2 through 5. As indicated by row 710, schematic diagram 700 illustrates four frames of an original video including a target character. Further, rows 720, 730, 740, and 750 illustrate albedo maps, normal maps, three-dimensional model representations, and three-dimensional texture representations corresponding to these frames, respectively. As seen in the drawing, the two-dimensional avatar images are warped and fit to the three-dimensional facial model and reflect the expressions of the character in the corresponding frames.

Figure 8:
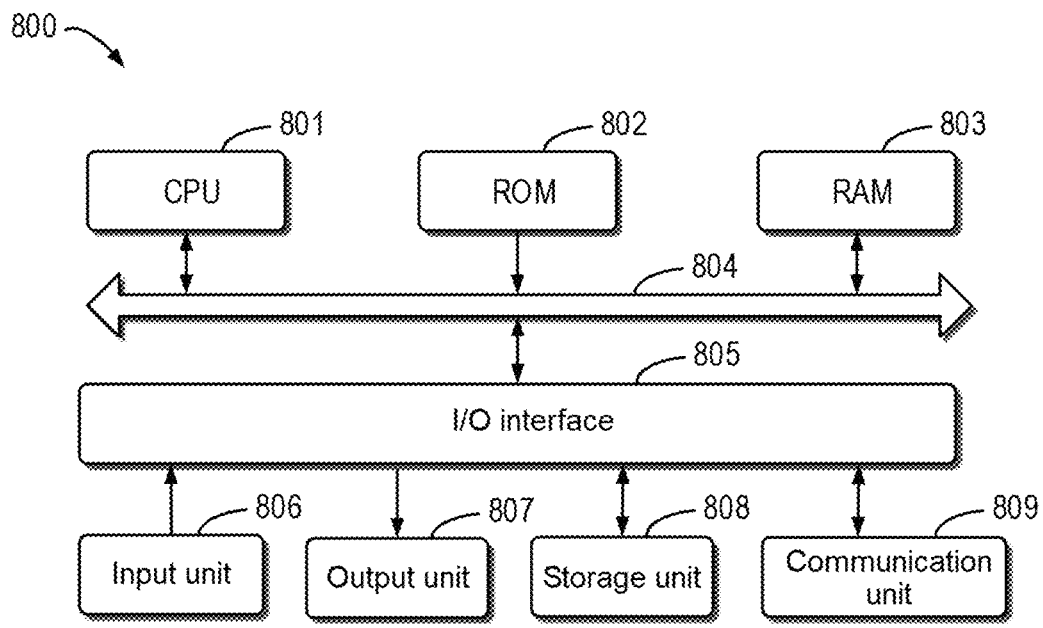
FIG. 8 illustrates a schematic block diagram of a device that can be used to implement embodiments of the present disclosure.

FIG. 8 illustrates a schematic block diagram of device 800 that may be used to implement embodiments of the present disclosure. Device 800 may be the device or apparatus described in embodiments of the present disclosure. As shown in FIG. 8, device 800 includes Central Processing Unit (CPU) 801, which may execute various appropriate actions and processing in accordance with computer program instructions stored in Read-Only Memory (ROM) 802 or computer program instructions loaded onto Random Access Memory (RAM) 803 from storage unit 808. Various programs and data required for the operation of device 800 may also be stored in RAM 803. CPU 801, ROM 802, and RAM 803 are connected to each other through bus 804. Input/Output (I/O) interface 805 is also connected to bus 804. Although not shown in FIG. 8, device 800 may also include a co-processor.

A plurality of components in device 800 are connected to I/O interface 805, including: input unit 806, such as a keyboard and a mouse; output unit 807, such as various types of displays and speakers; storage unit 808, such as a magnetic disk and an optical disc; and communication unit 809, such as a network card, a modem, and a wireless communication transceiver. Communication unit 809 allows device 800 to exchange information/data with other devices via a computer network, such as the Internet, and/or various telecommunication networks.

The various methods or processes described above may be performed by CPU 801. For example, in some embodiments, the method 200 may be embodied as a computer software program that is tangibly included in a machine-readable medium, such as storage unit 808. In some embodiments, part or all of the computer program may be loaded and/or installed onto device 800 via ROM 802 and/or communication unit 809. When the computer program is loaded into RAM 803 and executed by CPU 801, one or more steps or actions of the methods or processes described above, such as method 200, may be executed.

In some embodiments, the methods and processes described above may be implemented as a computer program product. The computer program product may include a computer-readable storage medium on which computer-readable program instructions for performing various aspects of the present disclosure are loaded.

The computer-readable storage medium may be a tangible device that may retain and store instructions used by an instruction-executing device. For example, the computer-readable storage medium may be, but is not limited to, an electrical storage device, a magnetic storage device, an optical storage device, an electromagnetic storage device, a semiconductor storage device, or any suitable combination of the above. More specific examples (a non-exhaustive list) of the computer-readable storage medium include: a portable computer disk, a hard disk, a RAM, a ROM, an erasable programmable read-only memory (EPROM or flash memory), a static random access memory (SRAM), a portable compact disc read-only memory (CD-ROM), a digital versatile disc (DVD), a memory stick, a floppy disk, a mechanical encoding device, for example, a punch card or a raised structure in a groove with instructions stored thereon, and any suitable combination of the foregoing. The computer-readable storage medium used herein is not to be interpreted as transient signals per se, such as radio waves or other freely propagating electromagnetic waves, electromagnetic waves propagating through waveguides or other transmission media (e.g., light pulses through fiber-optic cables), or electrical signals transmitted through electrical wires.

The computer-readable program instructions described herein may be downloaded from a computer-readable storage medium to various computing/processing devices, or downloaded to an external computer or external storage device via a network, such as the Internet, a local area network, a wide area network, and/or a wireless network. The network may include copper transmission cables, fiber optic transmission, wireless transmission, routers, firewalls, switches, gateway computers, and/or edge servers. A network adapter card or network interface in each computing/processing device receives computer-readable program instructions from a network and forwards the computer-readable program instructions for storage in a computer-readable storage medium in each computing/processing device.

The computer program instructions for performing the operations of the present disclosure may be assembly instructions, Instruction Set Architecture (ISA) instructions, machine instructions, machine-related instructions, microcode, firmware instructions, status setting data, or source code or object code written in any combination of one or more programming languages, including object-oriented programming languages as well as conventional procedural programming languages. The computer-readable program instructions may be executed entirely on a user computer, partly on a user computer, as a stand-alone software package, partly on a user computer and partly on a remote computer, or entirely on a remote computer or a server. In a case where a remote computer is involved, the remote computer can be connected to a user computer through any kind of networks, including a local area network (LAN) or a wide area network (WAN), or can be connected to an external computer (for example, connected through the Internet using an Internet service provider). In some embodiments, an electronic circuit, such as a programmable logic circuit, a field programmable gate array (FPGA), or a programmable logic array (PLA), is customized by utilizing status information of the computer-readable program instructions. The electronic circuit may execute the computer-readable program instructions so as to implement various aspects of the present disclosure.

These computer-readable program instructions may be provided to a processing unit of a general-purpose computer, a special-purpose computer, or a further programmable data processing apparatus, thereby producing a machine, such that these instructions, when executed by the processing unit of the computer or the further programmable data processing apparatus, produce means for implementing functions/actions specified in one or more blocks in the flow charts and/or block diagrams. These computer-readable program instructions may also be stored in a computer-readable storage medium, and these instructions cause a computer, a programmable data processing apparatus, and/or other devices to operate in a specific manner; and thus the computer-readable medium having instructions stored includes an article of manufacture that includes instructions that implement various aspects of the functions/actions specified in one or more blocks in the flow charts and/or block diagrams.

The computer-readable program instructions may also be loaded to a computer, other programmable data processing apparatuses, or other devices, so that a series of operating steps may be executed on the computer, the other programmable data processing apparatuses, or the other devices to produce a computer-implemented process, such that the instructions executed on the computer, the other programmable data processing apparatuses, or the other devices may implement the functions/actions specified in one or more blocks in the flow charts and/or block diagrams.

The flow charts and block diagrams in the drawings illustrate the architectures, functions, and operations of possible implementations of the devices, methods, and computer program products according to various embodiments of the present disclosure. In this regard, each block in the flow charts or block diagrams may represent a module, a program segment, or part of an instruction, and the module, program segment, or part of an instruction includes one or more executable instructions for implementing specified logical functions. In some alternative implementations, functions marked in the blocks may also occur in an order different from that marked in the accompanying drawings. For example, two consecutive blocks may in fact be executed substantially concurrently, and sometimes they may also be executed in a reverse order, depending on the functions involved. It should be further noted that each block in the block diagrams and/or flow charts as well as a combination of blocks in the block diagrams and/or flow charts may be implemented using a dedicated hardware-based system that executes specified functions or actions, or using a combination of special hardware and computer instructions.

Various embodiments of the present disclosure have been described above. The foregoing description is illustrative rather than exhaustive, and is not limited to the disclosed various embodiments. Numerous modifications and alterations will be apparent to those of ordinary skill in the art without departing from the scope and spirit of the illustrated embodiments. The selection of terms as used herein is intended to best explain the principles and practical applications of the various embodiments and their associated improvements, so as to enable persons of ordinary skill in the art to understand the various embodiments disclosed herein.

What is claimed is:

1. A method for processing video, comprising:
    generating, based on a reference image and a first frame of a video comprising an object, a two-dimensional avatar image of the object;
    generating a base three-dimensional avatar of the object by performing a three-dimensional transformation on the two-dimensional avatar image and the object in the first frame; and
    generating a three-dimensional avatar video corresponding to the video based on the base three-dimensional avatar and features of the video, the features comprising image differences of the object between adjacent frames of the video;
    wherein the method is implemented using a generation model for three-dimensional avatar videos, and the generation model is trained based on a loss function that includes a plurality of cross-modality loss components including an image-audio loss component, an image-text loss component, and an audio-text loss component; and
    wherein the loss function is determined at least in part by:
    determining the image-audio loss component as an image-audio contrastive loss function based on image data and audio data;
    determining the image-text loss component as an image-text contrastive loss function based on the image data and text data;
    determining the audio-text loss component as an audio-text contrastive loss function based on the audio data and the text data; and
    determining the loss function based on the image-audio contrastive loss function, the image-text contrastive loss function, and the audio-text contrastive loss function.

2. The method according to claim 1, wherein generating the base three-dimensional avatar comprises:
    generating a three-dimensional projection representation of the object based on shape, posture, and expression of the object in the first frame and the two-dimensional avatar image.

3. The method according to claim 2, wherein generating a three-dimensional projection representation of the object comprises:
    generating the three-dimensional projection representation of the object based on the shape, posture, expression, and texture details of the object in the first frame and the two-dimensional avatar image.

4. The method according to claim 3, wherein generating the base three-dimensional avatar further comprises:
    generating the base three-dimensional avatar based on a camera position at which the first frame was captured, color and lighting information of the two-dimensional avatar image, and the three-dimensional projection representation.

5. The method according to claim 1, wherein the features of the video further comprise voice features and text features, and generating the three-dimensional avatar video comprises:
    acquiring fused features of the video based on features of the image differences, the voice features of the video, and the text features of the video; and
    generating the three-dimensional avatar video based on the base three-dimensional avatar and the fused features.

6. The method according to claim 1, wherein the method further comprises:
    generating, based on a first frame of a source video comprising a three-dimensional avatar, audio data of the source video, and text data of the source video, a predictive video comprising the three-dimensional avatar; and
    determining the loss function for training the generation model based on image data in the source video and the predictive video, the audio data, and the text data.

7. The method according to claim 6, further comprising training the generation model by using the loss function.

8. The method according to claim 6, further comprising training the generation model by using one or more of the following:
    a motion loss function for determining a motion loss of a three-dimensional avatar video generated by the generation model; and
    a style loss function for determining a style loss of the three-dimensional avatar video generated by the generation model.

9. The method according to claim 1, wherein determining the loss function further comprises:
    determining a landmark loss function based on the image data; and
    determining the loss function based on the image-audio contrastive loss function, the image-text contrastive loss function, the audio-text contrastive loss function, and the landmark loss function.

10. A computer program product tangibly stored on a non-transitory computer-readable medium and comprising machine-executable instructions, wherein the machine-executable instructions, when executed by a machine, cause the machine to perform actions comprising:
    generating, based on a reference image and a first frame of a video comprising an object, a two-dimensional avatar image of the object;
    generating a base three-dimensional avatar of the object by performing a three-dimensional transformation on the two-dimensional avatar image and the object in the first frame; and
    generating a three-dimensional avatar video corresponding to the video based on the base three-dimensional avatar and features of the video, the features comprising image differences of the object between adjacent frames of the video;
wherein the actions are implemented using a generation model for three-dimensional avatar videos, and the generation model is trained based on a loss function that includes a plurality of cross-modality loss components including an image-audio loss component, an image-text loss component, and an audio-text loss component; and
wherein the loss function is determined at least in part by:
determining the image-audio loss component as an image-audio contrastive loss function based on image data and audio data;
determining the image-text loss component as an image-text contrastive loss function based on the image data and text data;
determining the audio-text loss component as an audio-text contrastive loss function based on the audio data and the text data; and
determining the loss function based on the image-audio contrastive loss function, the image-text contrastive loss function, and the audio-text contrastive loss function.

11. An electronic device, comprising:
at least one processor; and
memory coupled to the at least one processor, wherein the memory has instructions stored therein which, when executed by the at least one processor, cause the electronic device to perform actions comprising:
generating, based on a reference image and a first frame of a video comprising an object, a two-dimensional avatar image of the object;
generating a base three-dimensional avatar of the object by performing a three-dimensional transformation on the two-dimensional avatar image and the object in the first frame; and
generating a three-dimensional avatar video corresponding to the video based on the base three-dimensional avatar and features of the video, the features comprising image differences of the object between adjacent frames of the video;
wherein the actions are implemented using a generation model for three-dimensional avatar videos, and the generation model is trained based on a loss function that includes a plurality of cross-modality loss components including an image-audio loss component, an image-text loss component, and an audio-text loss component; and
wherein the loss function is determined at least in part by:
determining the image-audio loss component as an image-audio contrastive loss function based on image data and audio data;
determining the image-text loss component as an image-text contrastive loss function based on the image data and text data;
determining the audio-text loss component as an audio-text contrastive loss function based on the audio data and the text data; and
determining the loss function based on the image-audio contrastive loss function, the image-text contrastive loss function, and the audio-text contrastive loss function.

12. The electronic device according to claim 11, wherein generating the base three-dimensional avatar comprises:
generating a three-dimensional projection representation of the object based on shape, posture, and expression of the object in the first frame and the two-dimensional avatar image.

13. The electronic device according to claim 12, wherein generating a three-dimensional projection representation of the object comprises:
generating the three-dimensional projection representation of the object based on the shape, posture, expression, and texture details of the object in the first frame and the two-dimensional avatar image.

14. The electronic device according to claim 13, wherein generating the base three-dimensional avatar further comprises:
generating the base three-dimensional avatar based on a camera position at which the first frame was captured, color and lighting information of the two-dimensional avatar image, and the three-dimensional projection representation.

15. The electronic device according to claim 11, wherein the features of the video further comprise voice features and text features, and generating the three-dimensional avatar video comprises:
acquiring fused features of the video based on features of the image differences, the voice features of the video, and the text features of the video; and
generating the three-dimensional avatar video based on the base three-dimensional avatar and the fused features.

16. The electronic device according to claim 11, wherein the actions further comprise:
generating, based on a first frame of a source video comprising a three-dimensional avatar, audio data of the source video, and text data of the source video, a predictive video comprising the three-dimensional avatar; and
determining the loss function for training the generation model based on image data in the source video and the predictive video, the audio data, and the text data.

17. The electronic device according to claim 16, wherein the actions further comprise training the generation model by using the loss function.

18. The electronic device according to claim 11, wherein determining the loss function further comprises:
determining a landmark loss function based on the image data; and
determining the loss function based on the image-audio contrastive loss function, the image-text contrastive loss function, the audio-text contrastive loss function, and the landmark loss function.

* * * * *